(12) United States Patent
Lei (10) Patent No.: US 7,886,979 B2
(45) Date of Patent: Feb. 15, 2011

(54) METHODS FOR ILLUMINATING BARCODES

(75) Inventor: Ming Lei, Acton, MA (US)

(73) Assignee: Microscan Systems, Inc., Renton, WA (US)

( * ) Notice: Subject to any disclaimer, the term of this patent is extended or adjusted under 35 U.S.C. 154(b) by 543 days.

(21) Appl. No.: 11/857,210

(22) Filed: Sep. 18, 2007

(65) Prior Publication Data

US 2008/0105748 A1 May 8, 2008

Related U.S. Application Data

(60) Provisional application No. 60/845,703, filed on Sep. 19, 2006.

(51) Int. Cl.
*G06K 7/10* (2006.01)

(52) U.S. Cl. .......... 235/462.42; 235/454; 235/462.01; 235/462.09

(58) Field of Classification Search .......... 235/454, 235/462.01, 462.06, 462.09, 462.1, 462.11, 235/462.41, 462.42, 462.45, 462.46
See application file for complete search history.

(56) References Cited

U.S. PATENT DOCUMENTS

| 7,287,697 | B2 | 10/2007 | Ehrhart et al. | |
|---|---|---|---|---|
| 7,604,174 | B2 * | 10/2009 | Gerst et al. | 235/462.32 |
| 7,614,563 | B1 * | 11/2009 | Nunnink et al. | 235/473 |
| 2003/0062413 | A1 | 4/2003 | Gardiner et al. | |
| 2004/0032581 | A1 | 2/2004 | Nikoonahad | |
| 2004/0207836 | A1 | 10/2004 | Chhibber | |
| 2005/0279836 | A1 | 12/2005 | Havens et al. | |
| 2006/0175409 | A1 * | 8/2006 | Reichenbach et al. | 235/454 |
| 2007/0080229 | A1 | 4/2007 | Longacre, Jr. et al. | |
| 2007/0090193 | A1 | 4/2007 | Nunnink | |
| 2007/0091332 | A1 | 4/2007 | Nunnink | |
| 2007/0125863 | A1 * | 6/2007 | Jakoboski et al. | 235/462.41 |
| 2007/0131770 | A1 * | 6/2007 | Nunnink | 235/454 |
| 2007/0152064 | A1 * | 7/2007 | Nunnink et al. | 235/462.42 |
| 2007/0199996 | A1 | 8/2007 | He | |
| 2008/0036873 | A1 | 2/2008 | Silver | |
| 2008/0105745 | A1 | 5/2008 | Lei | |
| 2008/0105746 | A1 | 5/2008 | Lei | |
| 2008/0105749 | A1 | 5/2008 | Lei | |
| 2008/0142604 | A1 * | 6/2008 | Nunnink | 235/473 |
| 2008/0296393 | A1 | 12/2008 | Jovanovski et al. | |

FOREIGN PATENT DOCUMENTS

EP  1 903 474 A1  3/2008

OTHER PUBLICATIONS

European Search Report, Application No. EP07116726, dated Jan. 14, 2008.
U.S. Office Action mailed Feb. 19, 2010, U.S. Appl. No. 11/857,191, filed Sep. 18, 2007, 11 pages.
U.S. Notice of Allowance mailed Aug. 5, 2010, U.S. Appl. No. 11/857,191, filed Sep. 18, 2007, 6 pages.

* cited by examiner

*Primary Examiner*—Daniel A Hess
*Assistant Examiner*—Paultep Savusdiphol
(74) *Attorney, Agent, or Firm*—Blakely Sokoloff Taylor & Zafman LLP (57) ABSTRACT

Certain exemplary embodiments can comprise a method, which can comprise obtaining an image of a barcode. The image can be obtained via a barcode reader. The barcode reader can comprise a camera. The camera can define a camera axis. The barcode reader can comprise a lighting module that comprises set of lighting elements that emit light.

21 Claims, 4 Drawing Sheets

METHODS FOR ILLUMINATING BARCODES

CROSS-REFERENCES TO RELATED APPLICATIONS

This application claims priority to, and incorporates by reference herein in its entirety, U.S. Provisional Patent Application Ser. No. 60/845,703, filed 19 Sep. 2006.

BACKGROUND

Data Matrix barcode can be directly marked on parts by altering the surface appearance using dot peen, laser etch, and other means. Data Matrix direct part marks can be used in many applications for quality control and/or productivity improvement. To decipher the information from the Data Matrix code, an imaging device with special lighting can be used to produce a suitable image of the barcode that can be processed by an information device.

SUMMARY

Certain exemplary embodiments can comprise a method, which can comprise obtaining an image of a barcode. The image can be obtained via a barcode reader. The barcode reader can comprise a camera. The camera can define a camera axis. The barcode reader can comprise a lighting module that comprises set of lighting elements that emit light.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a method, which can comprise obtaining an image of a barcode. The image can be obtained via a barcode reader. The barcode reader can comprise a camera. The camera can define a camera axis. The barcode reader can comprise a lighting module that comprises set of lighting elements that emit light.

Depending on a marking material and a method used for Data Matrix Marking (DPM), different types of lighting can be used by a barcode reader in order to attempt to decode direct part marks. For example, on-axis bright field lighting and/or off-axis dark field lighting can be used to illuminate direct part marks. To create a dark field image, a lighting device can be placed near a surface comprising the mark at a relatively low angle to the surface. The mark can be in a recessed area that might be relatively difficult to illuminate.

In addition to on-axis lighting (direct and/or diffused) for DPM barcodes, in certain exemplary embodiments, a small direct off-axis lighting module comprising a plurality light emitting diodes (LEDs) can be placed away from the on-axis lighting source at an angle to an axis of the camera. When the barcode reader is placed such that the on-axis lighting is nearly perpendicular to the mark surface to create a bright field image, the off-axis lighting module can create a different image that can be a dark field image. By varying the reading angle formed by the camera axis and the mark surface, the on-axis light can generate a first image that can be either a bright field or a dark field image. Substantially simultaneously and/or sequentially, at a substantially similar reading position, the off-axis lighting module can generate a second image that can be the dark field image by illuminating the mark from a lower angle. Analyzing two different images of the same barcode can increase the possibility of decoding the barcode and can improve the performance of the barcode reader. Certain exemplary embodiments can use red LED lighting for the on-axis lighting module and green or white LED lighting for the off-axis lighting module.

Figure 1:
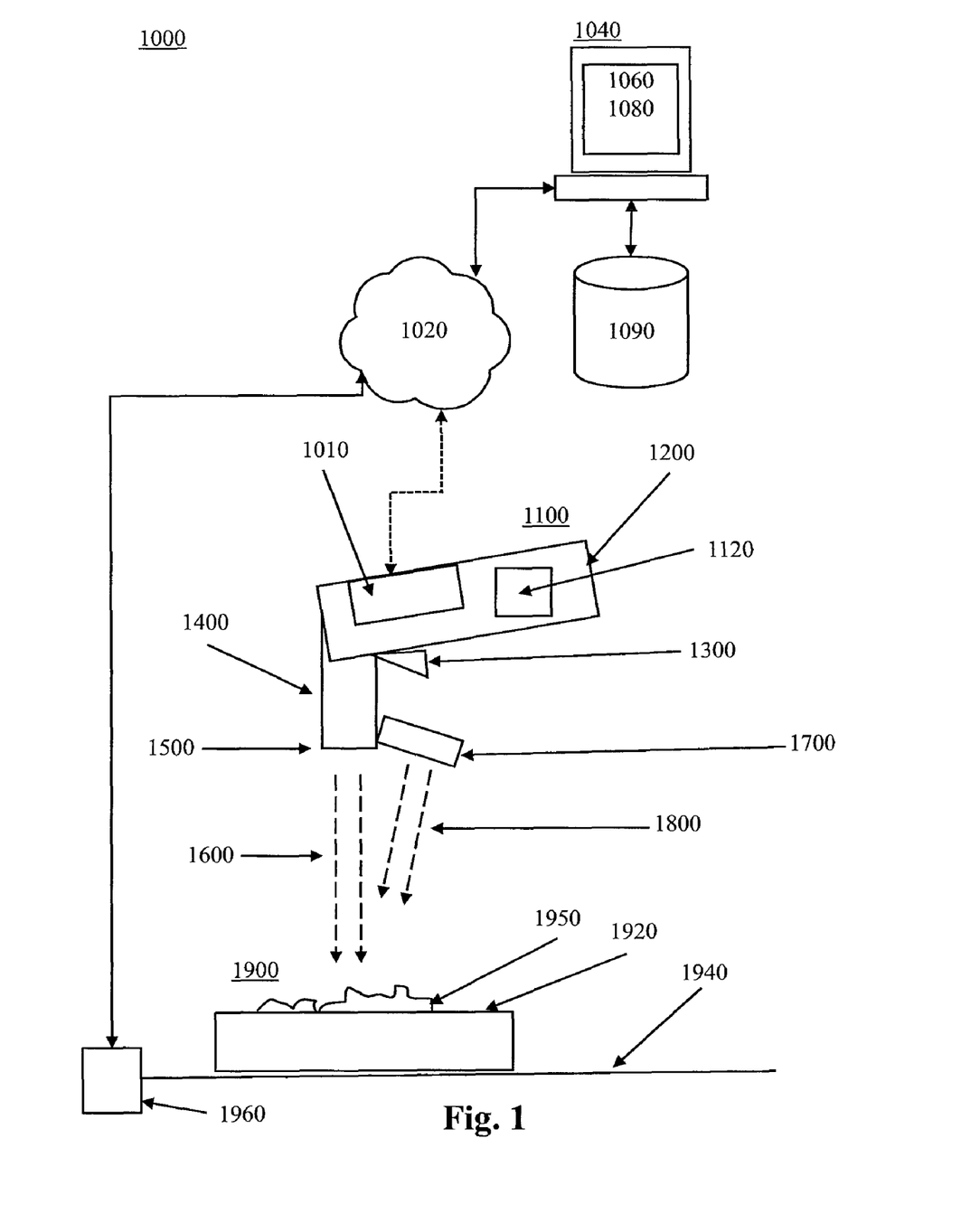
FIG. 1 is a block diagram of an exemplary embodiment of a system 1000.

FIG. 1 is a block diagram of an exemplary embodiment of a system 1000, which can comprise a barcode reader 1100, which can be a handheld barcode reader. Barcode reader 1100 can comprise a handle 1200, a camera 1400, trigger 1300, on-axis lighting module 1500, directional off-axis lighting module 1700. In certain exemplary embodiments, camera 1400 can comprise a central processing unit (CPU) and/or a memory. On-axis lighting module 1500 can be fixed to a frontal portion of camera 1400. Off-axis lighting module 1700 can be attached to a body of camera 1400 and/or handle 1200. For example, off-axis lighting module 1700 can be attached as a part of a body of camera 1400. In certain exemplary embodiments, a distance and/or angle between off-axis lighting module 1700 and camera 1400 can be adjustable. When barcode reader 1100 is held such that the camera direction is perpendicular to a mark surface 1920 of an object 1900 that can comprise a mark 1950, on-axis lighting module 1500 can create bright field lighting 1600, and off-axis lighting module 1700 can create dark field lighting 1800. When barcode reader 1100 is held such that the camera direction is at an angle significantly different than 90 degrees relative to mark surface 1920, both on-axis lighting module 1500 and off-axis lighting module 1700 can create dark field images. Mark 1950 can be a two dimensional direct part marking barcode.

In certain exemplary embodiments, barcode reader 1100 can be communicatively coupled, such as via a wireless transceiver 1010, to an information device 1040 via a network 1020. Wireless transceiver 1010 can be adapted to transmit a signal comprising information regarding the image to information device 1040. Information device 1040 can comprise a user interface 1060, a user program 1080, and a memory device 1090. User interface 1060 can be adapted to render information regarding illumination and/or images of mark 1950. User program 1080 can be adapted to monitor and/or control activities related to obtaining a decodable image of mark 1950. Memory device 1090 can be adapted to store image information regarding mark 1950 and/or activities associated with obtaining a decodable image of mark 1950. In certain exemplary embodiments, information device 1040 can be entirely and/or partially comprised by camera 1400. Information device 1040 can be adapted to receive information regarding the image from barcode reader 1100 via network 1020. Information device 1040 can be adapted to attempt to decode the image information. In certain exemplary embodiments, information device 1040 can receive a plurality of images from barcode reader 1100 and can analyze each of the plurality of images to determine an order in which to attempt to decode each of the plurality of images. Information device 1040 can comprise a processor adapted to decode the image of mark 1950.

In certain exemplary embodiments, object 1900 can be placed upon a surface such as surface 1940. Surface 1940 can be a movable surface such as a surface associated with a conveyor and/or a part mover of an assembly line. Information device 1040 can be communicatively coupled to a controller/actuator 1960 of surface 1940 via network 1020. Information device 1040 can be adapted to control a process to obtain a decodable image of mark 1950. For example, information device 1040 can control: a position and/or angle of camera 1400 relative to mark 1950; actuation of one or more subset of lights of on-axis lighting module 1500 and/or off-axis lighting module 1700; and/or a position of mark surface 1920 relative to camera 1400 via movement of surface 1940 (such as via sending a signal to controller/actuator 1960 requesting that surface 1940 be translated and/or rotated, possibly in a predetermined linear, curvilinear, and/or angular direction and/or distance).

In certain exemplary embodiments, handheld barcode reader 1100 can be a pistol grip barcode reader adapted to obtain an image of a two dimensional direct part marking barcode, such as mark 1950. In certain exemplary embodiments, on-axis lighting module 1500 can comprise first set of light emitting diodes (LEDs) having a first emitted color. On-axis lighting module 1500 can be adapted to direct light on an on-axis lighting direction that is approximately collinear with a camera axis. Off-axis lighting module 1700 can be substantially mirror-less, filter-less, and/or lens-less. Off-axis lighting module 1700 can comprise a second set of LEDs having a second emitted color. Off-axis lighting module 1700 can be adapted to direct light in an off-axis lighting direction that intersects the camera axis at an adjustable angle. The adjustable angle can be less than approximately fifty five degrees. The barcode reader can be adapted to obtain a decodable image at a distance between approximately one inch and approximately four inches from the two dimensional direct part marking barcode. Barcode reader 1100 can be adapted to receive off-axis lighting module 1700 at any of a plurality of locations on barcode reader 1100.

In certain exemplary embodiments, barcode reader 1100 can be adapted to automatically and/or sequentially obtain a first image, a second image, and a third image of the two dimensional direct part marking barcode. The first image can be obtained with only the on-axis lighting module illuminated. The second image can be obtained with only the off-axis lighting module illuminated. The third image can be obtained with both the on-axis lighting module and the off-axis lighting module illuminated simultaneously. Barcode reader 1100 and/or information device 1040 can be adapted to determine, based upon a comparison of the first image, the second image, and/or the third image, which of the first image, the second image, and the third image is decoded first in an attempt to determine a decodable image of the two dimensional direct part marking barcode.

In certain exemplary embodiments, off-axis lighting module 1700 can comprise a first subset of LEDs and a second subset of LEDs. The first subset of LEDs can be directed at a different angle relative to the camera axis from the second subset of LEDs. A light controller 1120 comprised by barcode reader 1100 can be adapted to obtain a first sequential image of mark 1950 with mark 1950 illuminated by only the first subset of LEDs. Light controller 1120 can be adapted to obtain a second sequential image of mark 1950 with mark 1950 illuminated by only the second subset of LEDs. Off-axis lighting module 1700 can comprise a plurality of subsets of LEDs. Each subset of the plurality of subsets of LEDs can be adapted to direct light energy that intersects the camera axis at a distinct angle relative to the camera axis. Each distinct angle can be less than approximately fifty five degrees from the camera axis. Light controller 1120 can be adapted to obtain a set of sequential images of mark 1950. Each image of the set of sequential images can be obtained with mark 1950 illuminated by only one subset of LEDs of the plurality of subsets of LEDs.

Reading DPM barcodes using a barcode reader with only an on-axis lighting module installed at the front of the camera can involve angling of the camera to create a contrast of barcode features. The addition of an off-axis lighting module can help create a different image that may have better contrast than that from the on-axis module. The off-axis lighting module can be attached and/or molded to be part of the camera body sitting on top of the camera or below it. The aiming angle of the off-axis lighting module may be adjustable. The off-axis lighting module can be operatively attached to the barcode reader via a flexible and adjustable mounting such that the user can place the off-axis lighting module on either side of the camera body or can mount the off-axis lighting module further away from the camera body to increase a dark field effect.

Figure 2:
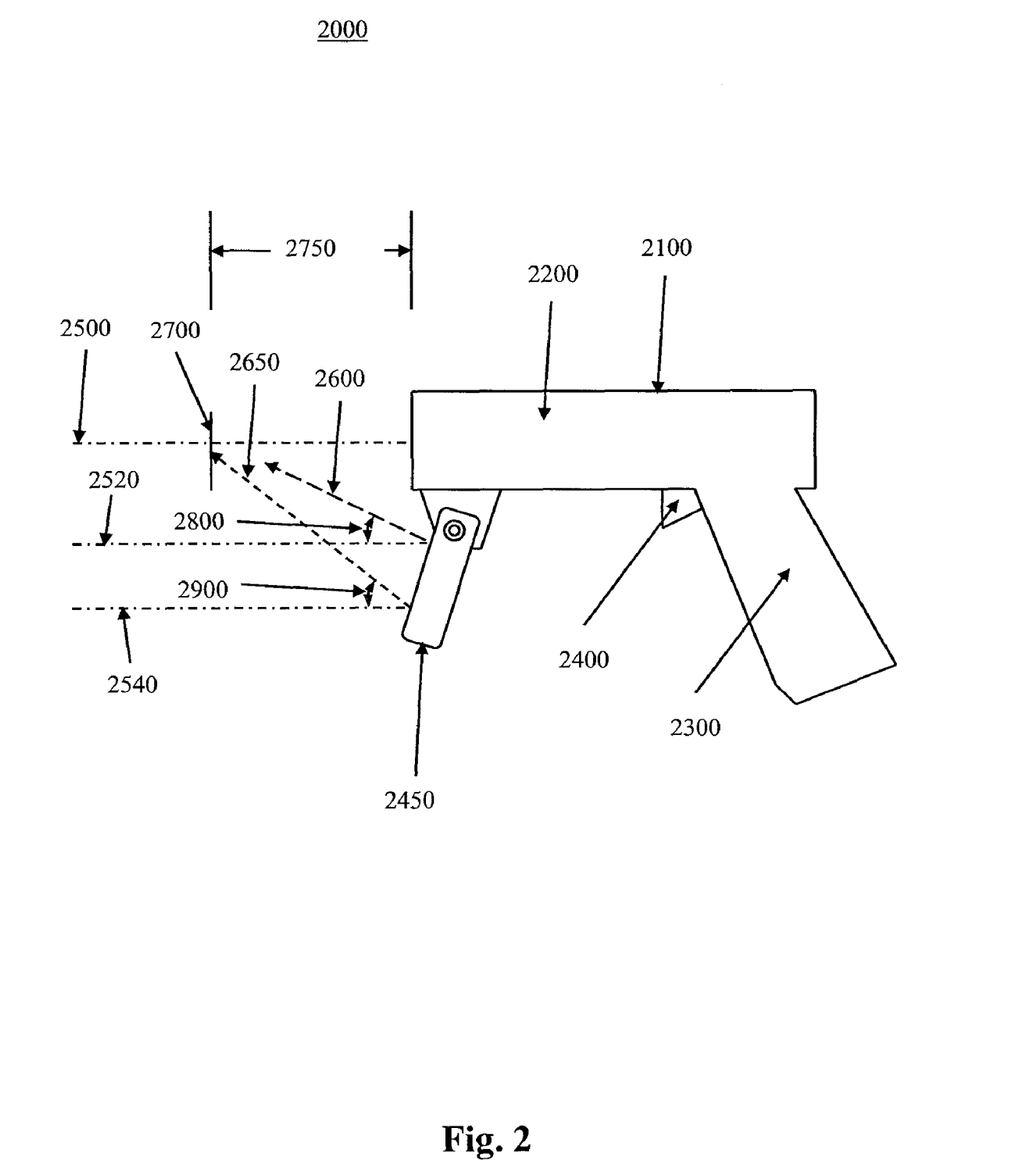
FIG. 2 is a block diagram of an exemplary embodiment of a system 2000.

FIG. 2 is a block diagram of an exemplary embodiment of a system 2000, which can comprise a barcode reader 2100. Barcode reader 2100 can comprise a camera 2200 a pistol grip handle 2300, a trigger 2400, and an off-axis lighting module 2450. In certain exemplary embodiments, off-axis lighting module 2450 can comprise a plurality of subsets of lighting elements, such as LEDs. For example, off-axis lighting module 2450 can comprise a first subset of lighting elements that can emit light energy substantially via first trajectory 2600 and a second subset of lighting elements that can emit light energy substantially via a second trajectory 2650. Via off-axis lighting module 2450 a Data Matrix Mark 2700 can be illuminated. Barcode reader 2100 can be placed at a distance 2750 from Data Matrix Mark 2700. In certain exemplary embodiments, distance 2750 can be, in inches, approximately 0.21, 0.4, 0.5, 0.81, 1, 1.22, 1.4, 1.99, 2, 2.07, 2.58, 3, 3.45, 3.80, 4, 4.08, 4.52, 5.11, 5.4, 5.99, 6.5, 7.8, 8, and/or any value or subrange therebetween.

First trajectory 2600 and/or second trajectory 2650 can be defined relative to a camera axis 2500 of barcode reader 2100. Each of first measuring axis 2520 and second memory axis 2540 can be substantially parallel to camera axis 2500 such that angles measured therefrom with respect to first trajectory 2600 and second trajectory 2650 can be substantially similar to angles measured based upon camera axis 2500. For example, first trajectory 2600 can define a first angle 2800 with respect to first measuring axis 2520. Second trajectory 2600 can define a second angle 2900 with respect to second measuring axis 2540. In certain exemplary embodiments, first angle 2800 and/or second angle 2900 can be, in degrees, 1, 3.8, 5.22, 9, 12.98, 15, 18.8, 25.74, 30, 33, 38.11, 40.87, 45, 49, 51.7, 55, 58.4, 59.9, 60, 63.59, 65, and/or any value or subrange therebetween. While two subsets of lights and associated angles are described in system 2000, any count of subsets of lights and angles can be used in accordance with exemplary embodiments of this disclosure. Thus, off-axis lighting module 2450 can comprise a plurality of subsets of LEDs. Each subset of the plurality of subsets of LEDs can be adapted to direct light energy that intersects camera axis 2500 at a distinct angle relative to camera axis 2500. Each distinct angle can be less than approximately fifty five degrees.

Figure 3:
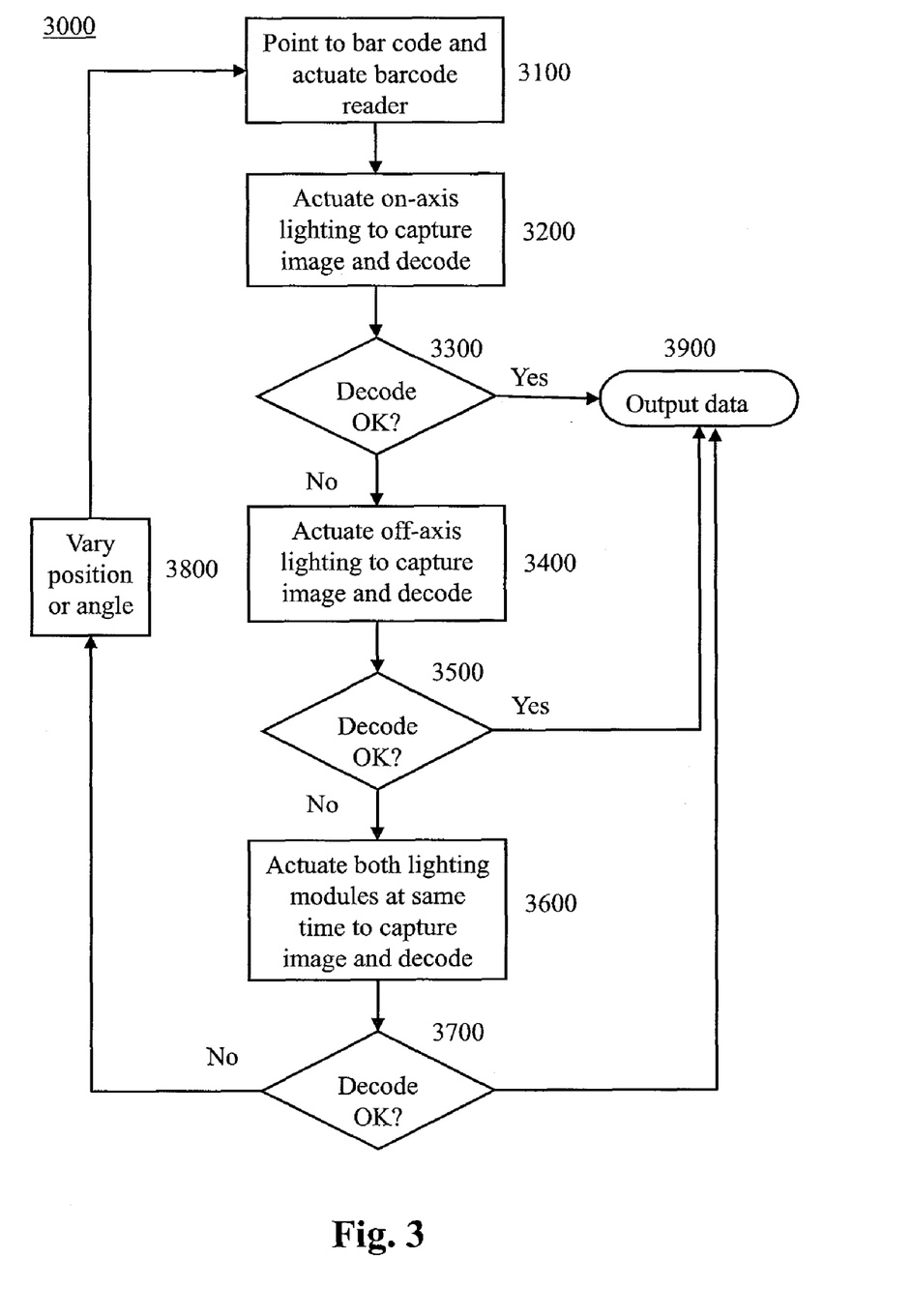
FIG. 3 is a flowchart of an exemplary embodiment of a method 3000.

FIG. 3 is a flowchart of an exemplary embodiment of a method 3000. Any activity of method 3000 can be performed automatically and can be implemented via machine instruction stored on a machine-readable medium. At activity 3100, a user can hold a trigger down or otherwise manually and/or automatically actuate a barcode reader. In certain exemplary embodiments, when a trigger is depressed and not released, the barcode reader can flash one or more lighting modules.

At activity 3200, an on-axis lighting module can be actuated to obtain and/or capture a first image for decoding. The first image can be of a two dimensional direct part marking. The first image can be obtained via a barcode pistol grip barcode reader that comprises a camera. The camera can define a camera axis. The barcode reader can comprise the on-axis lighting module that comprises first set of light emitting diodes (LEDs) having a first emitted color. The on-axis lighting module can be adapted to direct light on an on-axis lighting direction that is approximately collinear with the camera axis. In certain exemplary embodiments, the first image can be wirelessly transmitted to an information device that is adapted to attempt to decode the first image using well-known techniques. In certain exemplary embodiments, a CPU of the barcode reader can attempt to decode the first image using well-known techniques.

At activity 3300, if the first image can be successfully decoded, then the barcode reader and/or the information device can be adapted to continue method 3000 at activity 3900.

At activity 3400, the barcode reader can actuate the off-axis lighting module to capture a second image for decoding. The barcode reader can comprise the off-axis lighting module that is substantially mirror-less, filter-less, and/or lens-less. A distance between the off-axis lighting module and the camera can be adjustable. The off-axis lighting module can comprise a second set of LEDs having a second emitted color. The off-axis lighting module can be adapted to direct light in an off-axis lighting direction that intersects the camera axis at an adjustable angle. The adjustable angle can be less than approximately fifty five degrees. The barcode reader adapted to obtain a decodable image at a distance between approximately one inch and approximately four inches from the two dimensional direct part marking barcode. The second image can be wirelessly transmitted to the information device and/or processed by a CPU comprised by the barcode reader. In certain exemplary embodiments, the off-axis lighting module can comprise a plurality of subsets of LEDs. Each subset of the plurality of subsets of LEDs can be adapted to direct light energy that intersects the camera axis at a distinct angle relative to the camera axis. Each distinct angle can be less than approximately fifty five degrees. A light controller comprised by the barcode reader can be adapted to obtain a set of sequential images of the direct part marking barcode. Each image of the set of sequential images obtained with the direct part marking barcode can be illuminated by only one subset of LEDs of the plurality of subsets of LEDs. In certain exemplary embodiments, the second image can be wirelessly transmitted to an information device that is adapted to attempt to decode the image using well-known techniques. In certain exemplary embodiments, a CPU of the barcode reader can attempt to decode the second image using well-known techniques.

At activity 3500, if the second image can be successfully decoded, then the barcode reader and/or the information device can be adapted to continue method 3000 at activity 3900.

At activity 3600, the barcode reader can actuate the off-axis lighting module and the on-axis lighting module substantially simultaneously and can capture a third image for decoding. In certain exemplary embodiments, the third image can be wirelessly transmitted to an information device that is adapted to attempt to decode the image using well-known techniques. In certain exemplary embodiments, a CPU of the barcode reader can attempt to decode the third image using well-known techniques.

At activity 3700, if the third image can be successfully decoded, then the barcode reader and/or the information device can be adapted to continue method 3000 at activity 3900.

At activity 3800, the user and/or an information device can cause the position, angle, and/or direction of the camera, the lighting, and/or a position and/or location of barcode to vary. The activities of method 3000 can continue via at least one of activity 3100, activity 3400, or activity 3600 by flashing the on-axis and off-axis lighting sequentially and/or simultaneously and obtain additional images. For easy to read DPM barcodes, the user can configure the barcode reader to flash only one type of the two lighting modules which is more appropriate for a particular DPM barcode. For difficult to read marks (e.g., marks on curved surfaces), certain exemplary embodiments can provide the user with an option to enable simultaneous flashing of both lighting modules substantially simultaneously to create more uniform lighting over a larger area. The on-axis lighting module can be directed in a direction that is substantially non-perpendicular to a surface comprising the two dimensional direct part marking barcode. In certain exemplary embodiments, the first image can be wirelessly transmitted to an information device that is adapted to attempt to decode the image using well-known techniques. In certain exemplary embodiments, a CPU of the barcode reader can attempt to decode the third image using well-known techniques At activity 3900, the barcode reader and/or the information device can be adapted to report the decoded data. Once the decoded data is reported method 3000 can be ended.

Figure 4:
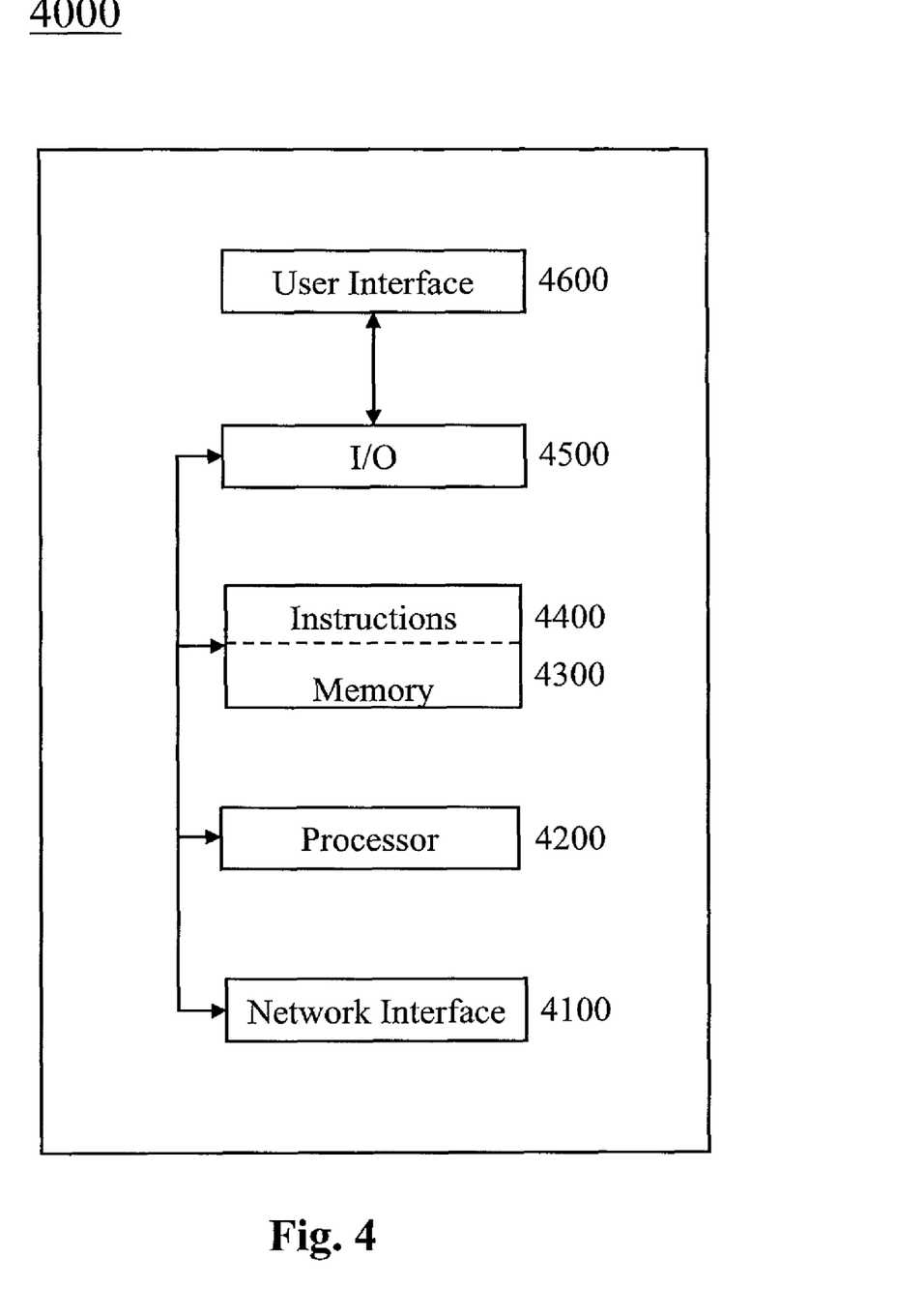
FIG. 4 is a block diagram of an exemplary embodiment of an information device 4000.

FIG. 4 is a block diagram of an exemplary embodiment of an information device 4000, which in certain operative embodiments can comprise, for example, information device 1040 of FIG. 1. Information device 4000 can comprise any of numerous components, such as for example, one or more network interfaces 4100, one or more processors 4200, one or more memories 4300 containing instructions 4400, one or more input/output (I/O) devices 4500, and/or one or more user interfaces 4600 coupled to I/O device 4500, etc.

In certain exemplary embodiments, via one or more user interfaces 4600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

activate—to actuate and/or set in motion and/or action.

activity—an action, act, deed, function, step, and/or process and/or a portion thereof.
adapted to—suitable, fit, and/or capable of performing a specified function.
adjacent—in close proximity to, near, next to, and/or adjoining.
adjustable—configured to change, match, and/or fit.
and/or—either in conjunction with or in alternative to.
angle—an amount of rotation that separates two intersecting lines and/or rays.
apparatus—an appliance or device for a particular purpose.
approximately—about and/or nearly the same as.
associated with—related to.
at least—not less than.
attach—to fasten, secure, couple, and/or join.
attempt—to try to achieve.
automatically—acting and/or operating in a manner essentially independent of external human influence and/or control. For example, an automatic light switch can turn on upon "seeing" a person in its view, without the person manually operating the light switch.
axis—a straight line about which a body or geometric object rotates or can be conceived to rotate and/or a center line to which parts of a structure or body can be referred.
barcode—information expressible as a series of symbols, such as clusters of dots, parallel bars of varying widths, etc., that can be read by an optical scanner and interpreted as numerical and/or alphabetical characters.
barcode reader—a device and/or system adapted to scan and/or decode a barcode.
based upon—determined in consideration of and/or derived from.
between—in a separating interval and/or intermediate to.
body—a main and/or central part.
both—two things together.
camera—a device often comprising a lightproof enclosure having an aperture with a lens through which a still and/or moving image of an object is focused and recorded on a photosensitive film, plate, tape, and/or or sensor coupled to an electronic and/or optical memory device (e.g., RAM, EEPROM, flash memory, magnetic disk, optical disk, etc.).
can—is capable of, in at least some embodiments.
capable—a potential for use.
cause—to bring about, provoke, precipitate, produce, elicit, be the reason for, result in, and/or effect.
collinear—occurring along a common line.
color—a visually perceivable characteristic of light energy that is related to a wavelength and/or wavelength range of that light energy.
compare—to examine in order to note similarities and/or differences in relation to something else.
component—a constituent element and/or part.
comprised by—included by.
comprise—to include but not be limited to.
decodable—capable of being decoded.
decode—to convert data by reversing the effect of previous encoding, and/or to interpret a code.
define—to establish the meaning, relationship, outline, form, and/or structure of; and/or to precisely and/or distinctly describe and/or specify.
degree—a unit of measurement of a plane angle that represents 1/360 of a full rotation.
design—(n) a purposeful arrangement of parts and/or details. For example, the design of a product and/or process can comprise designing predetermined aspects of the product and/or process. (v) to plan, such as in a manner that comprises the development of a graphic representation.
determine—to obtain, calculate, decide, deduce, establish, and/or ascertain.
device—a machine, manufacture, and/or collection thereof.
different—changed, distinct, and/or separate.
direct—to point, aim, and/or send toward a place or object.
direction—a spatial relation between something and a course along which it points and/or moves; a distance independent relationship between two points in space that specifies the position of either with respect to the other; and/or a relationship by which the alignment and/or orientation of any position with respect to any other position is established.
direct part marking (DPM)—a technology whereby an item is physically altered by methods such as dot peening, laser etching, molding, and/or embossing to provide a decodable symbol onto a surface of the item.
distance—a measure of physical and/or logical separation.
distinct—discrete and/or readily distinguishable from all others.
either—one or the other of two.
emit—to give off, send forth, and/or discharge.
filter-less—an optical system lacking a device adapted to reject light of certain frequencies while allowing other frequencies to pass.
first—an initial entity in an ordering.
for—with a purpose of.
from—used to indicate a source.
further—in addition.
green—a color of light having a wavelength range of approximately 520-570 nanometers.
haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.
have—to be identified by.
illuminate—to supply with light.
image—an at least two-dimensional representation of an entity and/or phenomenon.
information—facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.
information device—any device on which resides a finite state machine capable of implementing at least a portion of a method, structure, and/or or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

inch—a unit of length equal to approximately 25.4 millimeters.

intersect—to meet at a point.

lens—a piece of transparent substance, usually glass, having two opposite surfaces either both curved or one curved and one plane, used in an optical device for changing the convergence and/or focal point of light rays.

lens-less—substantially lacking a lens.

less than—having a measurably smaller magnitude and/or degree as compared to something else.

light—electromagnetic radiation of any wavelength.

light controller—a controller that is adapted to cause an illumination of one or more light sources.

light emitting diode (LED)—a semiconductor device that emits (typically visible) light responsive to an applied electrical conducting current.

machine instructions—directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine-readable—capable of being discerned by an information device.

machine-readable medium—a physical structure from which a machine, such as an information device, computer, microprocessor, and/or controller, etc., can obtain and/or store data, information, and/or instructions. Examples include memories, punch cards, and/or optically-readable forms, etc.

may—is allowed and/or permitted to, in at least some embodiments.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

mirror-less—substantially lacking an optically reflective surface.

mold—to and/r form a component.

network—a communicatively coupled plurality of nodes, communication devices, and/or information devices. Via a network, such devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, and/or one or more information devices, such as a switch, router, and/or gateway not directly connected to a local area network, etc., and/or any equivalents thereof.

network interface—any device, system, or subsystem capable of coupling an information device to a network. For example, a network interface can be a telephone, cellular phone, cellular modem, telephone data modem, fax modem, wireless transceiver, Ethernet card, cable modem, digital subscriber line interface, bridge, hub, router, or other similar device.

non—not.

object—a physical thing; an item associated with a radio frequency identification tag; a grouping of data and/or executable instructions; and/or a discrete graphical item that can be selected and maneuvered, such as an onscreen graphic.

obtain—to receive, get, take possession of, procure, acquire, calculate, determine, and/or compute.

off-axis lighting module—an illumination source from which light emanates in a direction that is intersects an axis of a camera associated therewith at an angle of greater than fifteen degrees.

on-axis lighting module—an illumination source from which light emanates in a direction that is substantially parallel to an axis of a camera associated therewith.

only—substantially without anything further.

opposing—opposite; against; being the other of two complementary or mutually exclusive things; placed or located opposite, in contrast, in counterbalance, and/or across from something else and/or from each other.

perpendicular—intersecting at or forming substantially right angles.

pistol grip—a device and/or system shape that is characterized by a comfortably humanly grippable protruding handle and an operatively attached barrel. The protruding handle defines a first longitudinal axis and the barrel defines a second longitudinal axis. The first longitudinal axis intersects the second longitudinal axis at an included angle that is greater than thirty degrees.

pivotable—capable of pivoting.

plurality—the state of being plural and/or more than one.

predetermined—established in advance.

processor—a hardware, firmware, and/or software machine and/or virtual machine comprising a set of machine-readable instructions adaptable to perform a specific task. A processor can utilize mechanical, pneumatic, hydraulic, electrical, magnetic, optical, informational, chemical, and/or biological principles, mechanisms, signals, and/or inputs to perform the task(s). In certain embodiments, a processor can act upon information by manipulating, analyzing, modifying, and/or converting it, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

provide—to furnish, supply, give, convey, send, and/or make available.

pull—to draw with force.

receive—to gather, take, acquire, obtain, accept, get, and/or have bestowed upon.

red—a color of light having a wavelength range of approximately 625-750 nanometers.

relative—considered with reference to and/or in comparison to something else.

regarding—pertaining to.

render—to display, annunciate, speak, print, and/or otherwise make perceptible to a human, for example as data, commands, text, graphics, audio, video, animation, and/or hyperlinks, etc., such as via any visual, audio, and/or haptic mechanism, such as via a display, monitor, printer, electric paper, ocular implant, cochlear implant, speaker, etc.

responsive—reacting to an influence and/or impetus.

said—when used in a system or device claim, an article indicating a subsequent claim term that has been previously introduced.

second—an entity immediately following a first entity in an ordering.

sequential—ordered in time.

sequentially—in an ordered consecutive manner.

set—a related plurality of predetermined elements; and/or one or more distinct items and/or entities having a specific common property or properties.

side—a surface bounding a solid object.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

simultaneously—at substantially the same time.

subset—a portion of a set.

substantially—to a considerable, large, and/or great, but not necessarily whole and/or entire, extent and/or degree.

surface—the outer boundary of an object or a material layer constituting or resembling such a boundary.

system—a collection of mechanisms, devices, data, and/or instructions, the collection designed to perform one or more specific functions.

transmit—to provide, furnish, supply, send as a signal, and/or to convey (e.g., force, energy, and/or information) from one place and/or thing to another.

transmitter—an electronic device that generates and radiates a meaningful signal electronically and/or via electromagnetic waves.

trigger—(n) a device, such as a lever, the pulling or pressing of which causes a predetermined action to take place; (v) to initiate. For example, a trigger can be a human activatable lever and/or button that is adapted to cause the predetermined action to take place.

two dimensional—substantially definable via coordinates relative to two perpendicular axes.

user interface—a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

utilize—to use and/or put into service.

via—by way of and/or utilizing.

wherein—in regard to which; and; and/or in addition to.

white—a color of a combination of substantially all and/or a widely diverse range of numerous colors of light having wavelengths between approximately 380 to 780 nanometers.

wireless—any communication technique that transmits a signal that does not require the use of a wire and/or guide connecting a transmitter and a receiver and/or utilizes electromagnetic waves emitted by an antenna (i.e., via an unguided medium), including such communication techniques as sonar, radio, cellular, cellular radio, digital cellular radio, ELF, LF, MF, HF, VHF, UHF, SHF, EHF, radar, microwave, satellite microwave, laser, infrared, etc., but excluding purely visual signaling, such as semaphore, smoke signals, sign language, etc., the communication technique having a baseband and/or carrier frequency ranging from about 1 Hz to about $2 \times 10^{14}$ Hz (about 200 teraHertz), including all values therebetween, such as for example, about 40 Hz, 6.010 kHz, 8.7 MHz, 4.518 GHz, 30 GHz, etc. and including all subranges therebetween, such as for example, from about 100 kHz to about 100 MHz, about 30 MHz to about 1 GHz, about 3 kHz to about 300 GHz, etc. Wireless communications can include analog and/or digital data, signals, and/or transmissions. Wireless communication can be via any of a plurality of protocols such as, for example, cellular CDMA, TDMA, GSM, GPRS, UMTS, W-CDMA, CDMA2000, TD-CDMA, 802.11a, 802.11b, 802.11g, 802.15.1, 802.15.4, 802.16, and/or Bluetooth, etc.

wireless transmitter—a device adapted to transfer a signal from a source to a destination without the use of wires.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, performed by multiple entities, and/or performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, every portion (e.g., title, field, background, summary, abstract, drawing figure, etc.) of this application, other than the claims themselves, is to be regarded as illustrative in nature, and not as restrictive.

What is claimed is:

1. A method comprising:

obtaining one or more images of a two dimensional direct part marking barcode, the one or more images obtained via a barcode pistol grip barcode reader comprising:

a camera, the camera defining a camera axis, an on-axis lighting module including a first set of light emitting diodes (LEDs) having a first emitted color, the on-axis lighting module adapted to direct light in an on-axis lighting direction that is collinear with the camera axis, and an off-axis lighting module that is mirror-less, filter-less, and lens-less, a distance between the off-axis lighting module and the camera adjustable, the off-axis lighting module including a second set of LEDs having a second emitted color, the off-axis lighting module adapted to direct light in an off-axis lighting direction that intersects the camera axis at an adjustable angle, the adjustable angle less than fifty-five degrees.

2. The method of claim 1 wherein the first emitted color is red and the second emitted color is white or green.

3. The method of claim 1 wherein the barcode reader is adapted to obtain a decodable image at a distance between one inch and four inches from the two dimensional direct part marking barcode.

4. The method of claim 1 wherein the off-axis lighting module comprises a plurality of subsets of LEDs, each subset of the plurality of subsets of LEDs adapted to direct light energy that intersects the camera axis at a distinct angle relative to the camera axis, each distinct angle less than fifty five degrees.

5. The method of claim 4 wherein the bar code reader further comprises a light controller coupled to the camera and to the off-axis lighting module to obtain a set of sequential images of the direct part marking barcode, each image of the set of sequential images obtained with the direct part marking barcode illuminated by only one subset of LEDs of the plurality of subsets of LEDs.

6. The method of claim 1, further comprising directing the on-axis lighting module in a direction perpendicular to a surface comprising the two dimensional direct part marking barcode.

7. The method of claim 1, further comprising directing the on-axis lighting module in a direction that is non-perpendicular to a surface comprising the two dimensional direct part marking barcode.

8. The method of claim 1, further comprising transmitting the image to a processor adapted to decode the image.

9. The method of claim 1, further comprising transmitting information regarding the image to an information device via a wireless transceiver or a network.

10. The method of claim 1, further comprising decoding at least one image of the one or more images, the image based upon a camera image obtained from an illumination of the two dimensional direct part marking barcode by the off-axis lighting module, the on-axis lighting module, or both the on-axis and off-axis lighting modules.

11. The method of claim 1 wherein obtaining one or more images comprises obtaining a first image, a second image, and a third image of the two dimensional direct part marking barcode, the first image obtained with only the on-axis lighting module illuminated, the second image obtained with only the off-axis lighting module illuminated, the third image obtained with both the on-axis lighting module and the off-axis lighting module illuminated simultaneously.

12. The method of claim 1 wherein the barcode reader comprises a trigger on the pistol grip, the trigger adapted to cause at least the first set of LEDs to illuminate.

13. The method of claim 12 wherein, responsive to a pull of the trigger, the barcode reader adapted to automatically and sequentially obtain the first image, a second image, and a third image of the two dimensional direct part marking barcode, the first image obtained with only the on-axis lighting module illuminated, the second image obtained with only the off-axis lighting module illuminated, the third image obtained with both the on-axis lighting module and the off-axis lighting module illuminated simultaneously.

14. A machine-readable medium comprising machine instructions for activities comprising:
obtaining one or more images of a two dimensional direct part marking, the one or more images obtained via a barcode pistol grip barcode reader that comprises:
a camera, the camera defining a camera axis,
an on-axis lighting module that comprises first set of light emitting diodes (LEDs) having a first emitted color, the on-axis lighting module adapted to direct light on an on-axis lighting direction that is collinear with the camera axis, and
an off-axis lighting module that is minor-less, filter-less, and lens-less, the off-axis lighting module comprising a second set of LEDs having a second emitted color, the off-axis lighting module adapted to direct light in an off-axis lighting direction that intersects the camera axis at an adjustable angle, the adjustable angle less than fifty-five degrees.

15. The machine-readable medium of claim 14, further comprising instructions to obtain a decodable image at a distance between one inch and four inches from the two dimensional direct part marking barcode.

16. The machine-readable medium of claim 14 wherein the off-axis lighting module comprises a plurality of subsets of LEDs, each subset of the plurality of subsets of LEDs adapted to direct light energy that intersects the camera axis at a distinct angle relative to the camera axis, each distinct angle less than fifty five degrees.

17. The machine-readable medium of claim 14, further comprising instructions to obtain a set of sequential images of the direct part marking barcode, each image of the set of sequential images obtained with the direct part marking barcode illuminated by only one subset of LEDs of the plurality of subsets of LEDs.

18. The machine-readable medium of claim 14, further comprising instructions to transmit at least one of the images to a processor adapted to decode images.

19. The machine-readable medium of claim 14, further comprising instructions to transmit information regarding the image to an information device via a wireless transceiver or a network.

20. The machine-readable medium of claim 14, further comprising instructions to decode at least one image of the one or more images, the image based upon a camera image obtained from an illumination of the two dimensional direct part marking barcode by the off-axis lighting module, the on-axis lighting module, or both the on-axis and off-axis lighting modules.

21. The machine-readable medium of claim 14 wherein obtaining one or more images comprises obtaining a first image, a second image, and a third image of the two dimensional direct part marking barcode, the first image obtained with only the on-axis lighting module illuminated, the second image obtained with only the off-axis lighting module illuminated, the third image obtained with both the on-axis lighting module and the off-axis lighting module illuminated simultaneously.

* * * * *

UNITED STATES PATENT AND TRADEMARK OFFICE
CERTIFICATE OF CORRECTION

| | | |
|---|---|---|
| PATENT NO. | : 7,886,979 B2 | Page 1 of 1 |
| APPLICATION NO. | : 11/857210 | |
| DATED | : February 15, 2011 | |
| INVENTOR(S) | : Lei | |

It is certified that error appears in the above-identified patent and that said Letters Patent is hereby corrected as shown below:

In Column 16, line 17 (claim 14, line 12) delete "minor-less" and replace with -- mirror-less --.

Signed and Sealed this
Fifth Day of April, 2011

David J. Kappos
*Director of the United States Patent and Trademark Office*